United States Patent
Ashcraft et al.

(10) Patent No.: US 9,591,402 B2
(45) Date of Patent: Mar. 7, 2017

(54) TRANSMIT AUDIO IN A TARGET SPACE

(75) Inventors: Britt C. Ashcraft, Tomball, TX (US);
Eric Chen, Houston, TX (US); Sandie Ning Ning Cheng, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 14/119,773

(22) PCT Filed: Jul. 18, 2011

(86) PCT No.: PCT/US2011/044330
§ 371 (c)(1),
(2), (4) Date: Nov. 22, 2013

(87) PCT Pub. No.: WO2013/012412
PCT Pub. Date: Jan. 24, 2013

(65) Prior Publication Data
US 2014/0119550 A1   May 1, 2014

(51) Int. Cl.
| | |
|---|---|
| H04R 29/00 | (2006.01) |
| H04R 3/00 | (2006.01) |
| G06F 3/16 | (2006.01) |
| H04N 21/475 | (2011.01) |
| H04N 21/485 | (2011.01) |
| H04N 21/81 | (2011.01) |
| H04R 1/32 | (2006.01) |
| H04R 3/12 | (2006.01) |
| H04S 7/00 | (2006.01) |
| H04R 27/00 | (2006.01) |

(52) U.S. Cl.
CPC .............. *H04R 3/00* (2013.01); *G06F 3/167* (2013.01); *H04N 21/475* (2013.01); *H04N 21/4852* (2013.01); *H04N 21/8106* (2013.01); *H04R 1/323* (2013.01); *H04R 3/12* (2013.01); *H04R 27/00* (2013.01); *H04R 2499/15* (2013.01); *H04S 7/302* (2013.01); *H04S 7/303* (2013.01)

(58) Field of Classification Search
CPC . H04R 3/00; H04R 3/12; H04R 27/00; H04R 2499/15; H04R 1/323; H04S 7/302; H04S 7/303; G06F 3/167; H04N 21/8106; H04N 21/4852; H04N 21/475
USPC ............................................ 381/59, 111, 123
See application file for complete search history.

(56) References Cited

U.S. PATENT DOCUMENTS

| | | |
|---|---|---|
| 5,668,882 A | 9/1997 | Hickman et al. |
| 6,324,052 B1 | 11/2001 | Azima et al. |
| 2004/0165015 A1 | 8/2004 | Blum et al. |
| 2006/0262935 A1 | 11/2006 | Goose et al. |
| 2007/0183618 A1 | 8/2007 | Ishii et al. |
| 2010/0027832 A1 | 2/2010 | Koseki |
| 2010/0329489 A1* | 12/2010 | Karaoguz ............... H04S 7/302 381/307 |
| 2011/0044467 A1* | 2/2011 | Pompei .................... H04R 5/02 381/77 |

(Continued)

*Primary Examiner* — Paul S Kim
(74) *Attorney, Agent, or Firm* — HP Patent Department (57) ABSTRACT

Implementations disclosed herein relate to transmitting audio in a target space relative to an electronic device (100, 200) using a directional speaker (103, 106) and non-directional speaker (104, 207). In one implementation, a directional speaker (103, 106) or non-directional speaker (104, 207) is selected to transmit audio based on a target space for the audio. The audio may then be transmitted from the selected speaker.

16 Claims, 6 Drawing Sheets

(56) References Cited

U.S. PATENT DOCUMENTS

2011/0058677 A1     3/2011   Choi et al.
2011/0091042 A1     4/2011   Ko et al.
2011/0103614 A1     5/2011   Cheung et al.

* cited by examiner

TRANSMIT AUDIO IN A TARGET SPACE

CROSS-REFERENCE TO RELATED APPLICATION

This application is a national stage application under 35 U.S.C. §371 of PCT/US2011/044330, filed Jul. 18, 2011.

BACKGROUND

An electronic device may include speakers for transmitting audio to an audience. For example, a user may listen to music, a movie, or a presentation from speakers on a laptop or other type of computer. The user may adjust the audio, for example, by changing the volume or by wearing headphones.

BRIEF DESCRIPTOR OF THE DRAWINGS

The drawings describe example implementations. The drawings show methods performed in an example order, but the methods may also be performed in other orders. The following detailed description references the drawings, wherein.

DETAILED DESCRIPTION

An electronic device may include speakers for transmitting audio. In some cases, a user may adjust the sound, such as by wearing headphones, attaching additional speakers, or turning up the volume. However, the electronic device itself may not easily adjust to different audio modes tailored to different types of audiences.

To address this issue, in one implementation, an electronic device may include settings for automatically adjusting audio to tailor it to an audience relative position and distance from the electronic device. For example, a user may want the audio to be heard by the user as if he were wearing headphones. The user may later want to use the same electronic device to play music to a large audience.

In one implementations an electronic device includes a directional speaker and a non-directional speaker. The electronic device may determine an audio configuration to achieve a selected audio mode for transmitting sound within a particular target space. The electronic device may select one or more speakers for achieving the desired result. For example, the electronic device may use the directional speaker for a smaller audio target space and a non-directional speaker for a larger audio target space. The non-directional speaker may also he used where the audio mode functionality is turned off. In some cases, multiple directional speakers may be used where the speakers transmit audio in different directions. An electronic device with multiple audio modes may allow a user to adapt the audio to different uses and audience types more easily.

Figure 1:
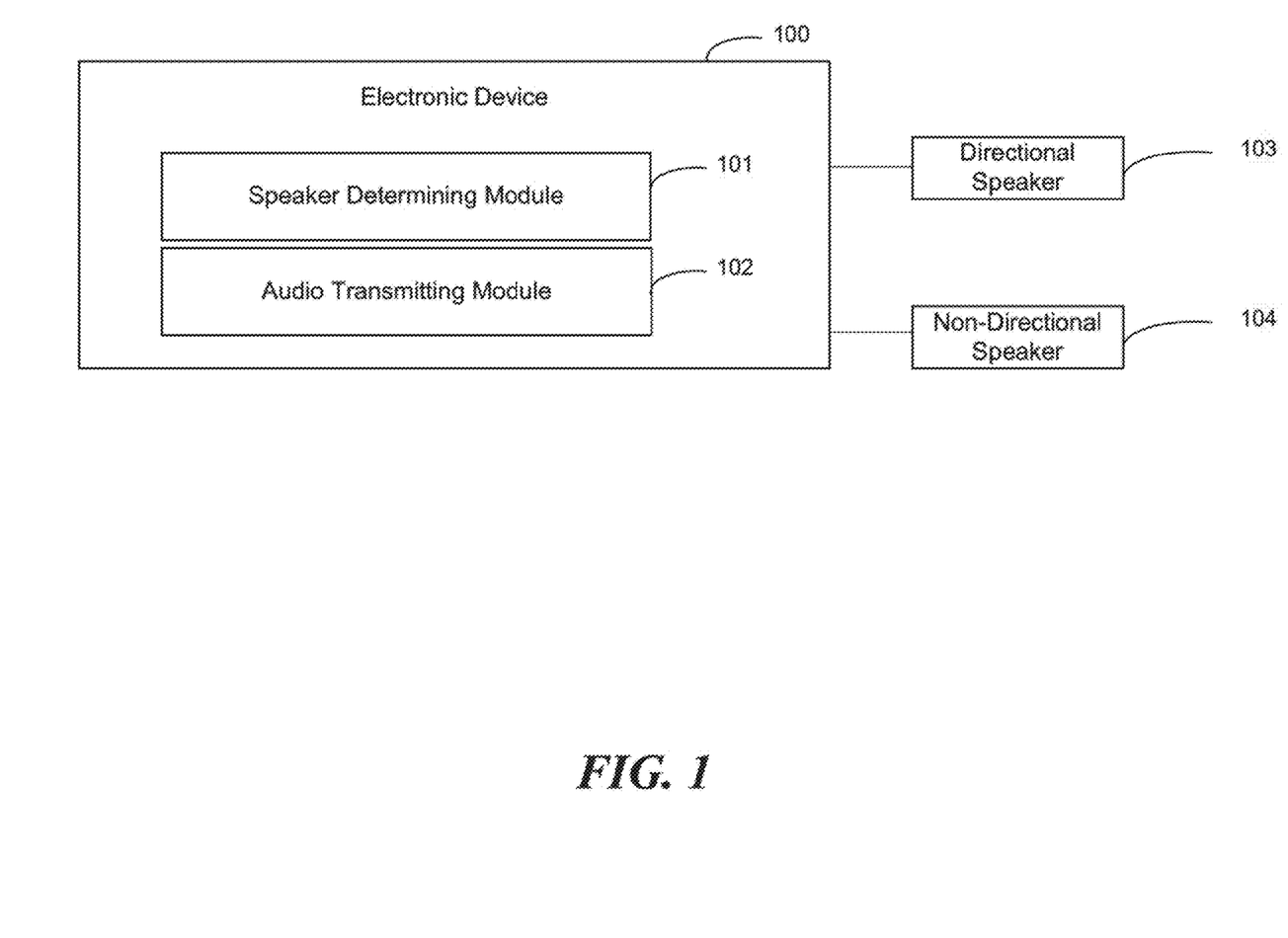
FIG. 1 is a block diagram illustrating one example of an electronic device.

FIG. 1 is a diagram illustrating one example of an electronic device 100. The electronic device 100 may be, for example, a desktop, laptop, or mobile computing device. The electronic device 100 includes a speaker determining module 101, an audio transmitting module 102, a directional speaker 103, and a non-directional speaker 104. In one implementation, the electronic device 100 determines whether to transmit audio from the directional speaker 103 and the non-directional speaker 104 based on a target space for the audio. For example, the directional speaker 103 may be used to transmit audio in a particular target space, and the non-directional speaker 104 may be used for a larger target space or where a particular target space is not selected. In some cases, the distance from which the audio may he heard may also be adjusted. For example, the audio may be adjusted to further change the distance relative to the electronic device 100 from which audio from the directional speaker 103 or non-directional speaker 104 may be heard.

The directional speaker 103 and non-directional speaker 104 may be included within the electronic device 100 or attached externally to the electronic device 100. The directional speaker 103 may be any suitable speaker for transmitting audio in a particular direction. In some cases, the electronic device 100 may include multiple directional speakers where each speaker transmits audio in a different direction from the electronic device 100. The directional speaker 103 may transmit audio such that a person outside of the audio cone created by the directional speaker 103 may be unable to hear the audio. The non-directional speaker 104 may be any suitable speaker for transmitting audio. For example, the non-directional speaker 104 may be a standard speaker that transmits audio generally rather than in a specific direction.

The electronic device may include a processor. The processor may be any suitable processor, such as a central processing unit (CPU), a semiconductor-based microprocessor, or any other device suitable for retrieval and execution of instructions. In one implementation, the electronic device includes logic instead of or in addition to the processor. As an alternative or in addition to fetching, decoding, and executing instructions, the processor may include one or more integrated circuits (ICs) (e.g., an application specific integrated circuit (ASIC)) or other electronic circuits that comprise a plurality of electronic components for performing the functionality described below. In one implementation, the electronic device 100 includes multiple processors. For example, one processor may perform some functionality and another processor may perform other functionality described below. The processor or logic may execute the functionality of the speaker determining module 101 and the audio transmitting module 102.

In one implementation, the speaker determining module 101 and the audio transmitting module 102 include instructions stored in a machine-readable storage medium. The machine-readable storage medium may be any suitable machine readable medium, such as an electronic, magnetic, optical, or other physical storage device that stores executable instructions or other data (e.g., a hard disk drive, random access memory, flash memory, etc.). The machine-readable storage medium may be, for example, a computer readable non-transitory medium. The machine-readable storage medium may include instructions in the speaker determining module 101 and the audio transmitting module 102 executable by a processor.

The speaker determining module 101 may include instructions and/or logic to determine whether to use the directional speaker 103 or the non-directional speaker 104. In some cases, the speaker determining module 101 may further include instructions and/or logic to determine which of several directional speakers or non-directional speakers to use. A processor may determine which speaker to use based on a target space for audio transmitted from the electronic device 100. For example, the directional speaker 103 may be used where audio is desired in a more specific area such that it is limited to a smaller target space or a target space within a particular direction relative to the electronic device 100.

The audio transmitting module 102 may include instructions and/or logic to transmit audio from the determined speaker. For example, audio associated with an application may be transmitted from the directional speaker 103 or the non-directional speaker 104. In some cases, the audio may be transmitted with other characteristics to further control the target space. For example, an audio cone from a speaker may altered to have a larger or smaller diameter, or may be altered to send audio farther from the electronic device 100.

Figure 2:
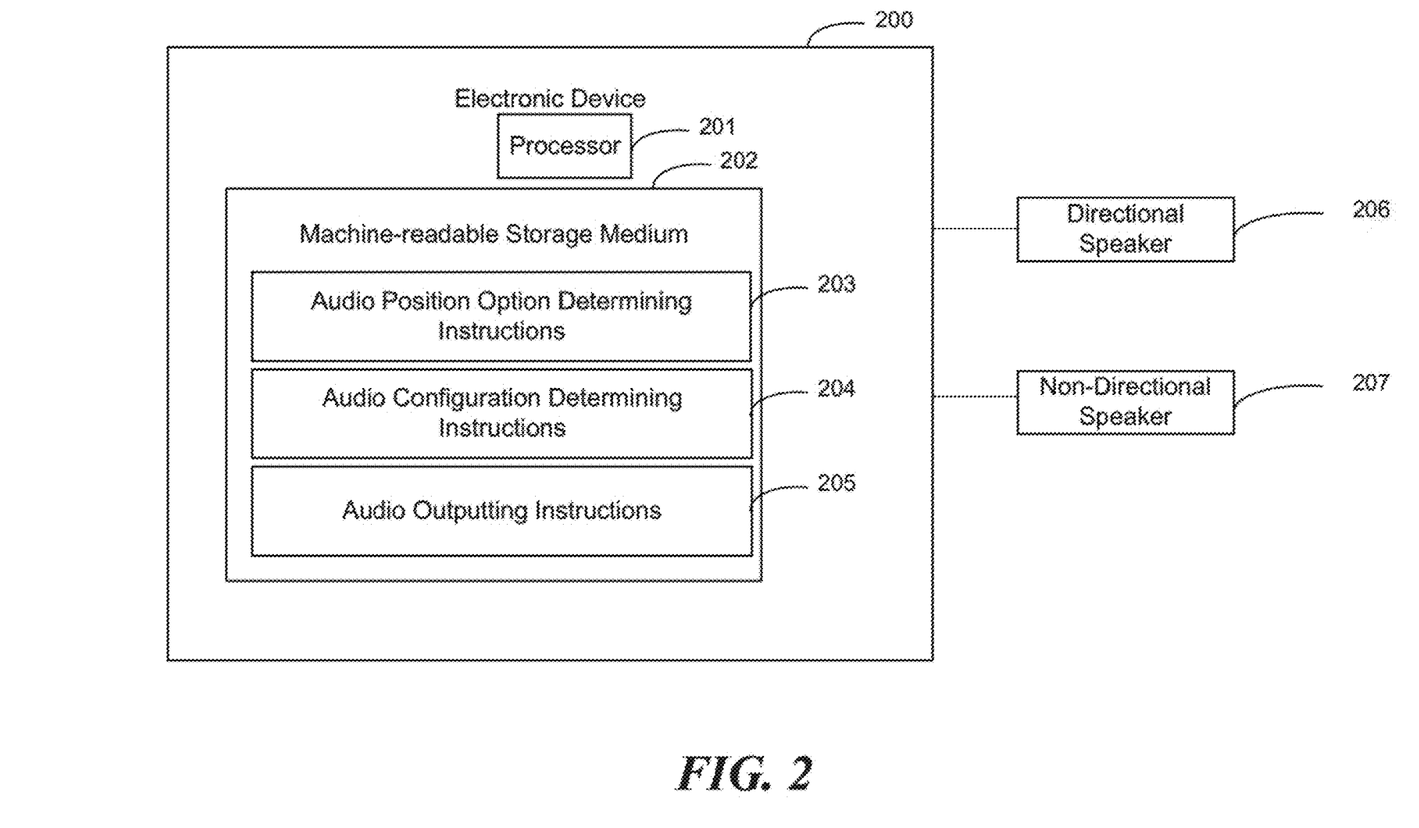
FIG. 2 is a block diagram illustrating one example of an electronic device.

FIG. 2 is a block diagram illustrating one example of an electronic device 200. The electronic device 200 may be, for example, a desktop, laptop, or mobile computing device. The electronic device 200 may include speakers for transmitting audio, such as a directional speaker 208 and a non-directional speaker 207. In one implementation, the electronic device 200 may offer a sliding scale of audio modes such that the audio may be transmitted into different target spaces. For example, a user may select a small group setting where the audio is transmitted into a limited target space in front of the electronic device 200 close to the electronic device, or the user may select a presentation setting where the audio is transmitted into a large target space surrounding the electronic device 200. In some cases, the settings may indicate different audio types, such as an individual, library, or presentation mode.

The directional speaker 206 may be a speaker for transmitting audio in a particular direction. In some cases, the electronic device 200 may include multiple directional speakers where each speaker transmits audio in a different direction from the electronic device 200. The directional speaker 207 may transmit audio such that a person outside of the audio cone in a particular transmitted by the directional speaker 206 may be unable to hear the audio. The non-directional speaker 207 may be any suitable speaker for transmitting audio. For example, the non-directional speaker 207 may be a standard speaker that transmits audio generally rather than in a specific direction.

The electronic device 200 may include a processor 201 and a machine-readable storage medium 202. The processor 201 may be any suitable processor, such as a central processing unit (CPU), a semiconductor-based microprocessor, or any other device suitable for retrieval and execution of instructions. In one implementation, the electronic device 200 includes logic instead of or in addition to the processor 201. As an alternative or in addition to fetching, decoding, and executing instructions, the processor 201 may include one or more integrated circuits (ICs) (e.g., an application specie integrated circuit (ASIC)) or other electronic circuits that comprise a plurality of electronic components for performing the functionality described below. In one implementation, the electronic device 200 includes multiple processors. For example, one processor may perform some functionality and another processor may perform other functionality described below.

The machine-readable storage medium 202 may be any suitable machine readable medium, such as an electronic, magnetic, optical, or other physical storage device that stores executable instructions or other data (e.g., a hard disk drive, random access memory, flash memory, etc). The machine-readable storage medium 202 may be, for example, a computer readable non-transitory medium. The machine-readable storage medium 202 may include instructions executable by the processor 201.

The machine-readable storage medium 202 may include audio position option determining instructions 203, audio configuration determining instructions 204, and audio outputting instructions 205. The audio position option determining instructions 203 may include instructions to determine a target space for audio transmitted from the electronic device 200. For example, a user may want the audio to be heard in one location but not in another. The target space may be a particular distance and direction relative to the electronic device 200. The option may be selected by a user. For example, the electronic device 200 may include a button for selecting an audio option. In some cases, a user interface may be displayed to a user on a display device associated with the electronic device 200, and the user may select an audio position option from the user interface. In some cases, the processor 201 may determine audio position based on information provided by a user. For example, a user may indicate an audience size or an audio use, and the processor 201 may then determine a suitable audio position.

The audio configuration determining instructions 204 may include instructions to determine an audio configuration to provide the audio position option. The configuration may involve, for example, selecting speakers for use to transmit the audio or determining how to transmit audio from speakers, such as how to alter the audio cone transmitted from a particular speaker. The configuration may involve using the directional speaker 206 or the non-directional speaker 207. For example, the processor may determine whether the directional speaker 206 or the non-directional speaker 207 should be used to achieve the desired audio position. In some cases, both the directional speaker 208 and the non-directional speaker 207 may be selected. In one implementation, the electronic device 200 includes multiple directional speakers 206, and the audio configuration determining instructions 204 include instructions for determining which of the directional speakers to use. The configuration determination may involve looking up a configuration in a storage where the configuration is associated with an audio position option.

The audio outputting instructions 205 may include instructions to output the audio according to the determined configuration. For example, the processor 201 may send the audio to the speakers. The audio may be sent to a subset of selected speakers, such as to the directional speaker 206 or the non-directional speaker 207, or may be sent to be transmitted from a speaker in a particular manner.

Figure 3:
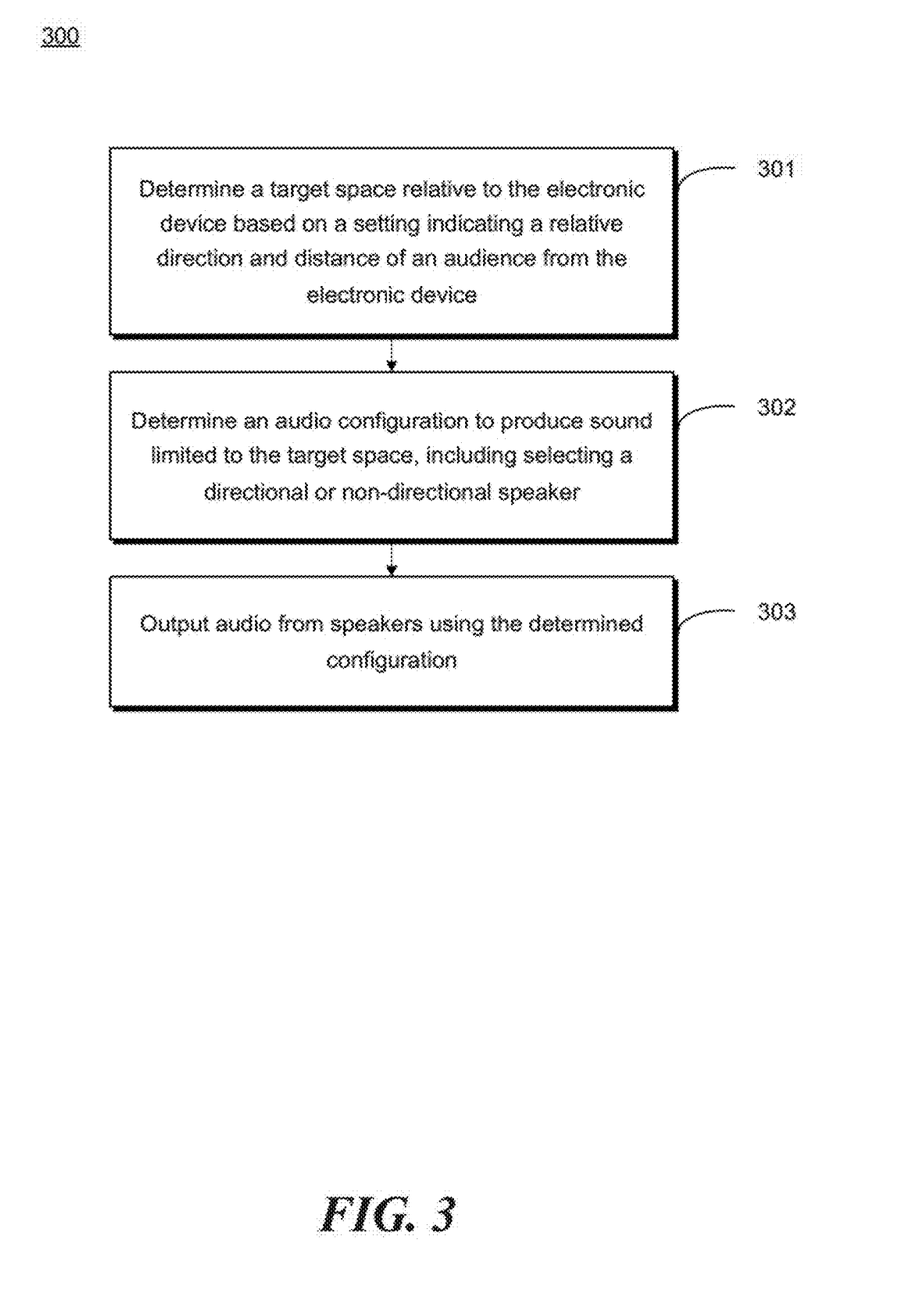
FIG. 3 is a flow chart illustrating one example of method to transmit audio within a target space.

FIG. 3 is a flow chart 300 illustrating one example of a method to transmit audio within a target space. An electronic device may transmit audio from speakers such that the audio is not heard outside of a target space, and the electronic device may offer multiple audio modes such that the target space may be updated based on the use of the electronic device. For example, a user may went to limit audio to an area where other people cannot hear it, such as where a user would like to adjust the audio so that it acts as if the user is wearing headphones. In some cases, there may be a larger audience for the audio or the user may be farther from the electronic device, in which case the target space for the audio may be larger.

In some cases, it may not be desirable to limit the area in which audio from the electronic device may be heard. For example, the target space may be the entire room containing the electronic device, such as where the audio is a presentation for the room or where a movie is being shown to the entire room. The audio may be tailored to the target space in pad by switching between a directional and non-directional speaker when the target space is changed. The method may be implemented, for example, by the electronic device 100 of FIG. 1 or the electronic device 200 of FIG. 2.

Beginning at 301, a processor or logic determines a target space relative to the electronic device based on a setting indicating a relative direction and distance of an audience from the electronic device. The processor may be a CPU or other processor. The processor may be, for example, the processor 201 from FIG. 2. The target space may be any suitable area relative to the electronic device. For example, the target space may be a particular distance and direction from the electronic device. The processor may determine the target space based on a user setting indicating an audience type, such as an individual user, couples, small group, or large group settings. In some cases, the user may further enter information about the direction of the audience from the electronic device. In some implementations, the user enters information about the audience size and position relative to the electronic device, and the processor determines which audio mode is tailored to the entered characteristics. In some cases, the electronic device may determine the characteristics of the audience automatically, such as based on data from a camera.

Continuing to 302, the processor or logic determines an audio configuration to produce sound limited to the target space. Determining the audio configuration may include selecting a directional or non-directional speaker. The processor may determine the configuration in any suitable manner. In some cases, a user may select a setting and the processor looks up the appropriate configuration for the setting in a database or other storage. In some cases, the user may provide criteria to the processor, and the processor determines an audio configuration to meet the criteria.

In one implementation, the audio configuration is a hardware configuration. For example, the electronic device may include multiple speakers and determining the audio configuration may involve determining which of the speakers to use to transmit audio. The processor may determine to use a directional or non-directional speaker. In one implementation, the electronic device may include directional speakers for different directions, and the processor determines which of the directional speakers to use. The processor may also determine whether to use multiple non-directional speakers, such as where the audience is farther from the electronic device.

In one implementation, the audio configuration is a software based configuration involving how audio is transmitted from speakers. For example, audio may be transmitted in a manner such that the audio cone is smaller or larger or extends farther from the electronic device. In some cases, determining the audio configuration may involve both selecting a speaker and determining a manner of transmitting sound from the selected speaker. In some cases, the electronic device may also set an initial volume for the speakers for the audio mode where the volume is louder for an audio mode meant to reach a target space farther from the electronic device.

Proceeding to 303, the processor or logic outputs audio from speakers using the determined configuration. The processor may output audio, such as music, movie audio, or other types of audio from the determined speakers in the determined manner. As a result, the audio may be limited to a target space such that people outside of the target space may be unable to hear the audio. In some cases, an audio mode may be selected such that the target space is large enough to warrant the use of a non-directional speaker. In some cases, the audio mode capabilities may be turned off such that the non-directional speaker is used.

Figure 4A:
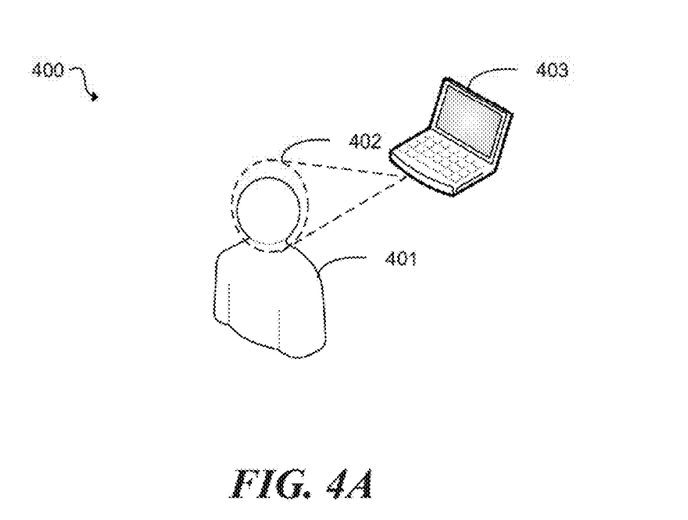
FIGS. 4A and 4B are diagrams illustrating transmitting audio within a target space using directional and non-directional speakers.
Figure 4B:
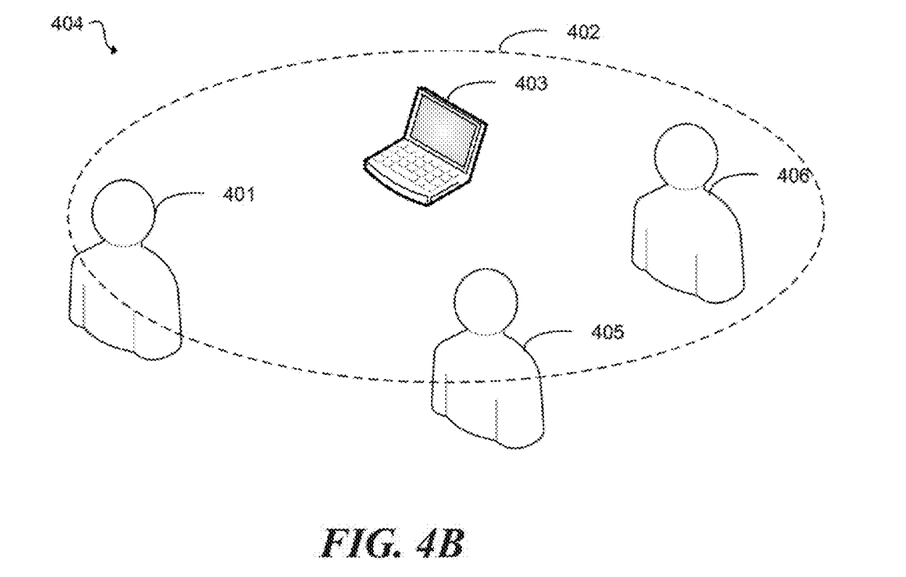

FIGS. 4A and 4B are diagrams illustrating transmitting audio within a target space using directional and non-directional speakers. FIG. 4A shows a diagram 400 of a user 401 in front of an electronic device 403. Audio cone 402 shows audio traveling from a speaker of the electronic device 403. A user may select a single user setting such that the audio may be configured to limit the audio to a single user or a small group of users such that headphones are not used. The audio cone 402 representing the travel of audio from the electronic device 403 shows that audio is transmitted such that if may be heard by the user 401, but that the audio may not be heard by people in surrounding areas outside of the audio cone 402. The audio cone 402 may be created by a directional speaker of the electronic device 403.

FIG. 4B shows a diagram 404 of an audio cone 402 surrounding the electronic device 403 such that the user 401 as well as additional users 405 and 408 may be able to hear sound from the audio cone 402. The audio cone 402 representing the travel of sound from the electronic device 403 may be created by a non-directional speaker associated with the electronic device 403. For example, a processor may determine that a different audio mode has been selected where the target space for the audio is larger and farther from the electronic device 403. The processor may determine that a non-directional speaker should be used to transmit audio to the target space associated with the selected audio mode.

Figure 5A:
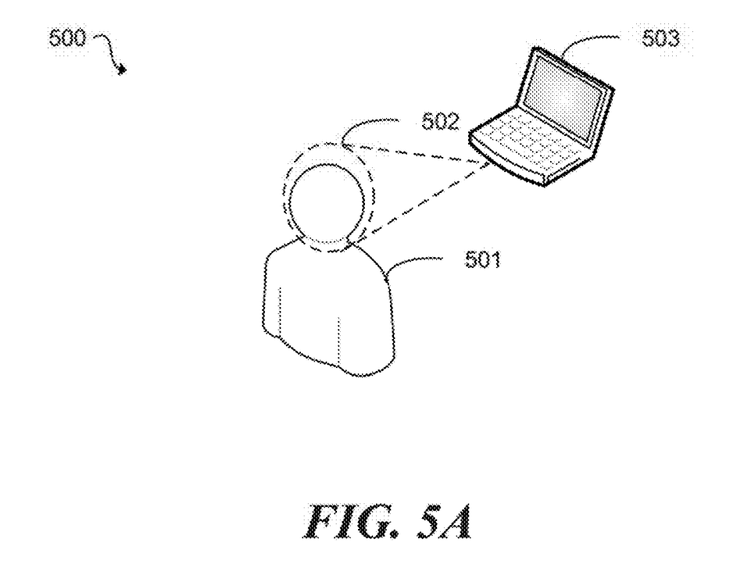
FIGS. 5A and 5B are diagrams illustrating transmitting audio within a target space in a particular direction.
Figure 5B:
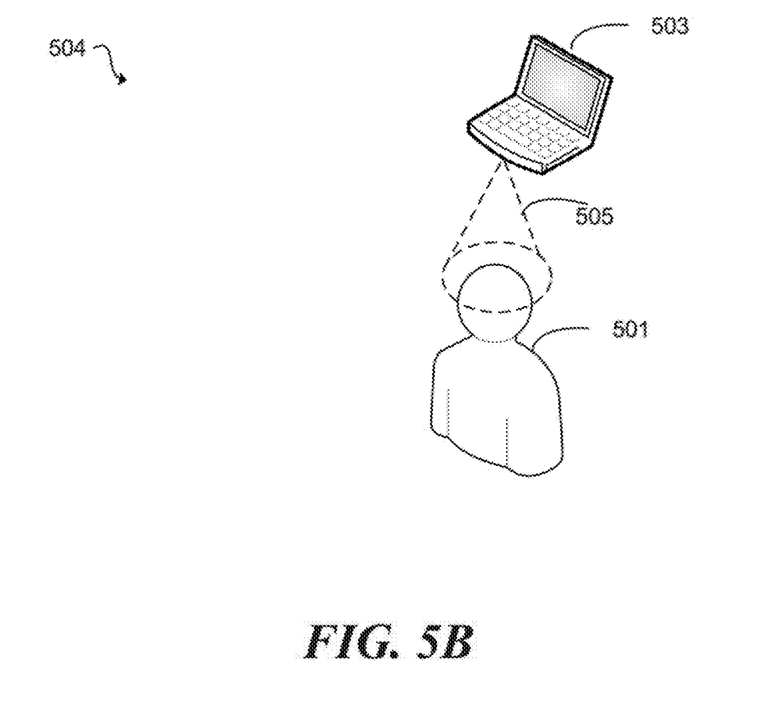

FIGS. 5A and 5B are diagrams illustrating transmitting audio within a target space in a particular direction. For example, FIG. 5A shows a diagram 500 of a user 501 of an electronic device 503. An audio cone 502 representing the travel of sound from a speaker is produced by a speaker of the electronic device 503 such that the user 501 may hear the audio. For example, the audio cone 502 may be transmitted when a user selects a headphone or individual user mode. In some cases, the user may indicate his position relative to the electronic device 503 or the electronic device 503 may sense the user's position relative to the electronic device 503. For example, the electronic device 503 may include a camera or motion sensor for sensing the position of the user.

FIG. 5B shows a diagram 504 where the user 501 has changed position relative to the electronic device 503. The electronic device 503 transmits the audio cone 505 such that the audio may be transmitted to a new target space where the user 501 is located. The change in direction may be implemented by using a different speaker associated with the electronic device 503 or by changing the method of transmitting audio from the same speaker. For example, a different directional speaker may be selected based on the new position of the user 501.

Figure 6A:
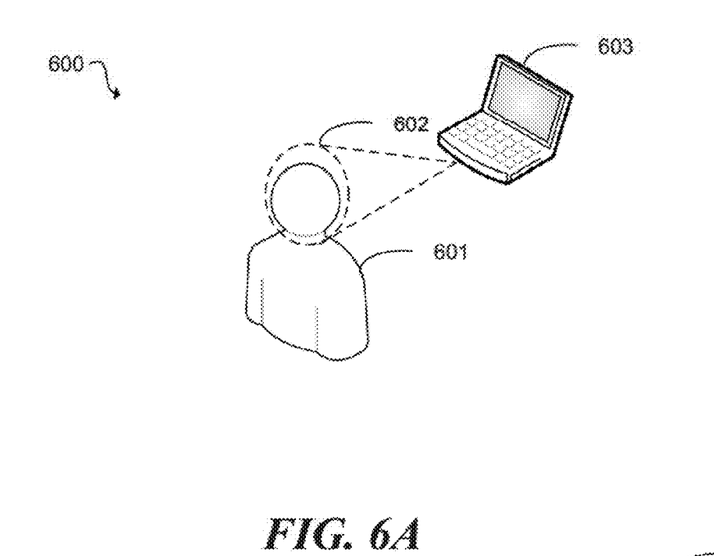
FIGS. 6A and 6B are diagrams illustrating transmitting audio within a target space tailored to an audience size.
Figure 6B:
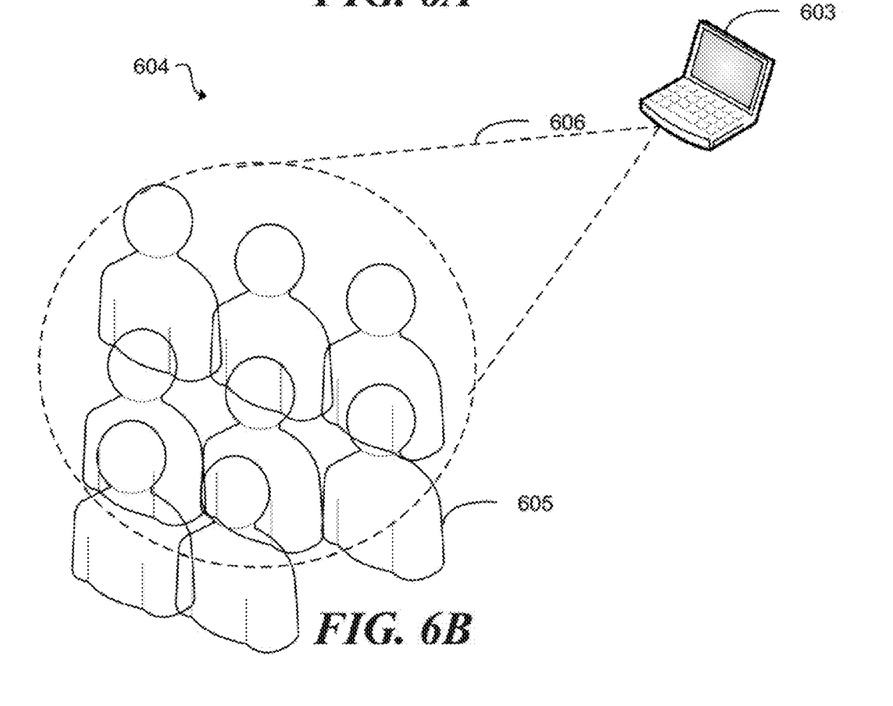

FIGS. 6A and 6B are diagrams illustrating transmitting audio within a target space tailored to an audience size. FIG. 6A shows a diagram 600 of a user 801 of an electronic device 803. The electronic device 603 transmits audio represented by audio cone 602 such that it is transmitted to a target space including the user 601. For example, an electronic device may have a setting for a user to select audio for a small audience such that the audio cone is limited in size and close to the electronic device.

FIG. 6B shows a diagram 604 of a group of users 805 where the group of users are listening to audio from the electronic device 803. The electronic device 803 may produce audio cone 606 such that the audio transmitted is within a target space appropriate for a larger audience. For example, the target space may be larger and farther from the electronic device 803. The electronic device 603 may use different speakers or a different manner of transmitting the audio than in FIG. 6B. In some cases, a non-directional speaker may he used where the audience size or target space exceeds a particular size.

Making multiple audio modes available to a user of an electronic device may improve the user experience with the electronic device. For example, a user may select an audio mode that is tailored to a particular use of the electronic device. One or more speakers and speaker settings may be automatically selected in order to transmit audio within a target space associated with the audio mode.

The invention claimed is:

1. An electronic device, comprising:
a directional speaker;
a non-directional speaker; and
a processor to:
determine to transmit audio from the directional speaker or the non-directional speaker based on a setting indicating a target audio space of a relative direction and distance from the electronic device; and
transmit audio from the determined speaker,
wherein the processor is to determine to transmit audio from the non-directional speaker if the setting indicates that the target audio space is larger than a specified size, and
wherein the processor is to determine to transmit audio from the directional speaker if the setting indicates that the target audio space is not larger than the specified size.

2. The electronic device of claim 1, wherein the setting is based on user input indicating a relative position of an audience to the electronic device.

3. The electronic device of claim 1, wherein determining to transmit audio from the directional speaker or the non-directional speaker comprises selecting one of a group of directional speakers for transmitting the audio.

4. The electronic device of claim 1, wherein the setting comprises a sliding scale of a size of a target space for the audio.

5. The electronic device of claim 1, wherein the setting is based on user input indicating an audience size.

6. A method, comprising:
determining, by a processor, a target space relative to an electronic device based on a setting indicating a relative direction and distance of an audience from the electronic device, wherein the electronic device comprises both a directional speaker and a non-directional speaker;
determining, by the processor, an audio configuration to produce sound limited to the target space, wherein determining the audio configuration comprises:
determining to transmit audio from the non-directional speaker when the setting indicates that the target space is larger than a specified size, and
determining to transmit audio from the directional speaker when the setting indicates that the target space is not larger than the specified size; and
outputting audio from the determined speaker according to the determined configuration.

7. The method of claim 6, wherein determining an audio configuration comprises determining which of a group of directional speakers to use.

8. The method of claim 6, wherein the setting comprises a setting based on the number of people in the audience.

9. The method of claim 6, wherein determining an audio configuration comprises determining at least one of a number of speakers to use.

10. The method of claim 6, wherein determining an audio configuration comprises determining a manner of outputting audio from a speaker.

11. The method of claim 6, wherein the setting is based on user input indicating a relative position of an audience to the electronic device.

12. A machine-readable non-transitory storage medium comprising instructions executable by a processor to:
determine an audio target space relative to an electronic device based on a setting, wherein the audio target space is a relative direction and distance from the electronic device, wherein the electronic device comprises both a directional speaker and a non-directional speaker;
determine an audio configuration to produce sound limited to the audio target space, wherein determining the audio configuration comprises:
determining to transmit audio from the non-directional speaker when the setting indicates that the selected audio target space is larger than a specified size, and
determining to transmit audio from the directional speaker when the setting indicates that the selected audio target space is not larger than the specified size; and
output the audio from the determined speaker according to the determined audio configuration.

13. The machine-readable non-transitory storage medium of claim 12, wherein outputting the audio according to the selected audio target space comprises determining which of a group of directional speakers to use to output the audio.

14. The machine-readable non-transitory storage medium of claim 12, further comprising instructions to determine the audio target space based on an audience size.

15. The machine-readable non-transitory storage medium of claim 12, wherein determining an audio configuration comprises changing a selection of directional speakers based on a changed position of an audience.

16. The machine-readable non-transitory storage medium of claim 12, further comprising instructions to determine the audio target space based on user input indicating a relative position of an audience to the electronic device.

* * * * *